Aug. 2, 1949.          J. D. TAYLOR          2,478,025
                        SNARE-TYPE TRAP
Filed Oct. 21, 1946                     3 Sheets-Sheet 1
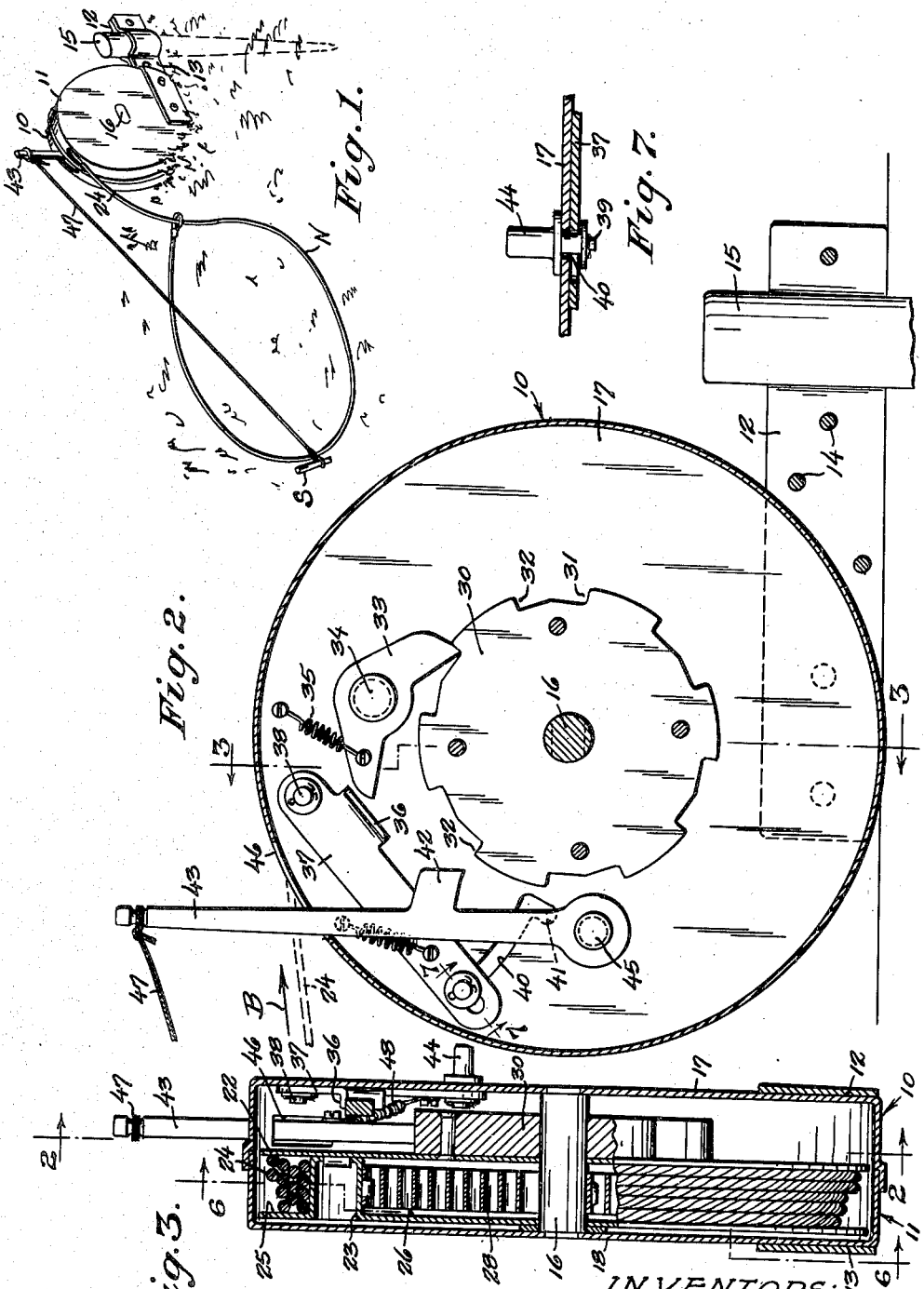
INVENTORS:
JAMES D. TAYLOR
ATTORNEY.

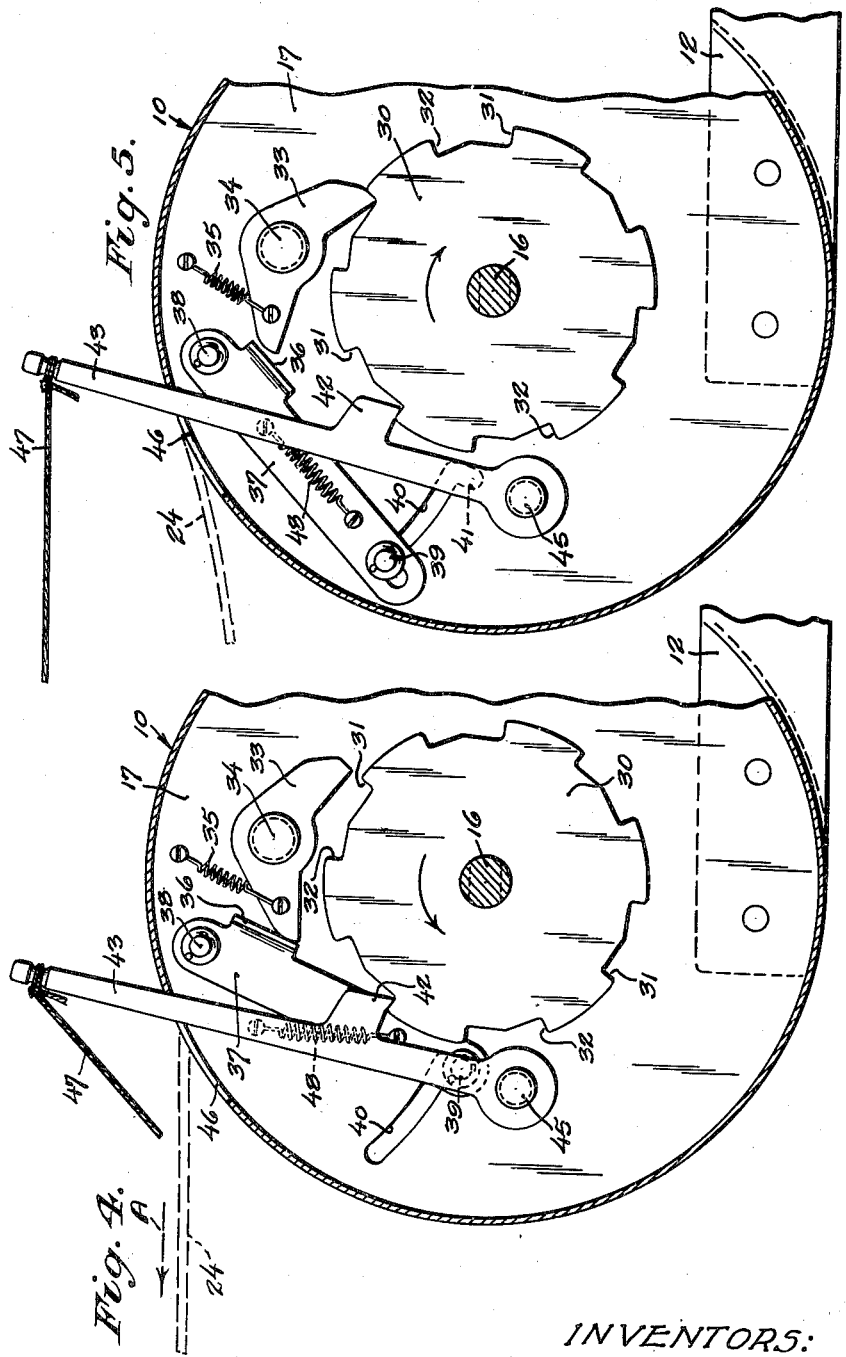

Patented Aug. 2, 1949

2,478,025

UNITED STATES PATENT OFFICE 2,478,025

SNARE-TYPE TRAP

James D. Taylor, Seattle, Wash., assignor to Draggo Snare Trap Co., a co-partnership composed of Eli P. Draggo and E. C. Goodwin Application October 21, 1946, Serial No. 704,769

6 Claims. (Cl. 43—87)

This invention relates to snare-type animal traps, and for its principal object aims to provide a trap of this nature embodying a noose which is caused to be activated by operation of a spring motor and which is particularly characterized in that the action of running out the snare serves to wind the spring for the motor.

Other and still more particular objects and advantages will, with the foregoing, appear and be understood in the course of the following detailed description and claims, the invention consisting in the novel construction and in the adaptation and combination of parts hereinafter described and claimed.

In the drawings:

Figure 1 is a perspective view showing a snare-trap produced in accordance with the now preferred embodiment of the present invention, and illustrating the snare in set position.

Fig. 2 is a longitudinal vertical sectional view of the housing member for the trap and portraying the trip-cord and the anchoring stake fragmentarily, the section being taken on line 2—2 of Fig. 3 and the parts being shown in the positions which they occupy after the trap has been sprung.

Fig. 3 is a transverse vertical sectional view on line 3—3 of Fig. 2.

Fig. 4 is a fragmentary longitudinal vertical sectional view similar to Fig. 2 excepting that the parts are here shown in the positions which they occupy when the trap is being set.

Fig. 5 is also a fragmentary longitudinal vertical sectional view similar to both Figs. 2 and 4 but illustrating the portrayed parts in the positions which they are caused to occupy when the trap is set.

Fig. 7 is a fragmentary detail section on line 7—7 of Fig. 2.

Figure 6:
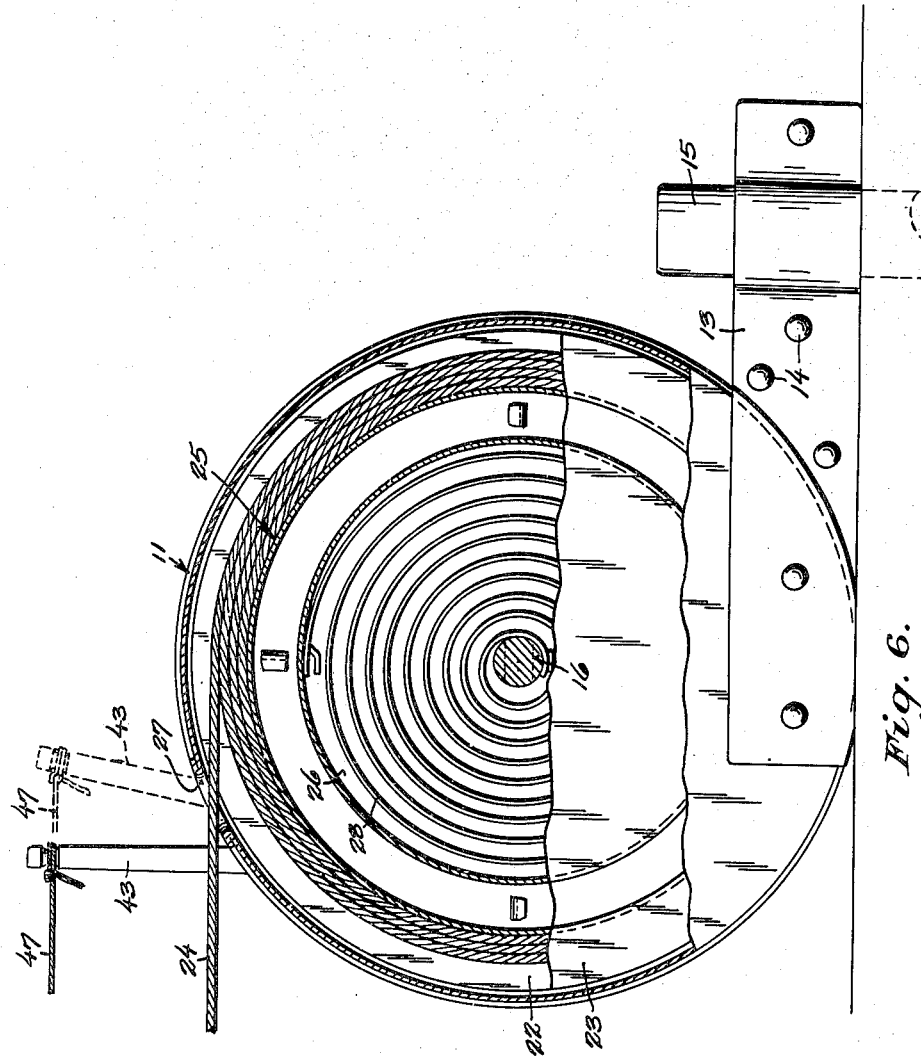
Fig. 6 is a fragmentary longitudinal vertical sectional view on line 6—6 of Fig. 3.

The trap of the present invention provides a shell desirably cylindrical in shape and comprised of two interfitting flanged parts indicated generally by the numerals 10 and 11, and these shell parts are or may be held together by straps 12 and 13 joined one to the part 10 and the other to the part 11 and themselves secured by means of bolts or the like 14. The two straps are placed more or less tangent to the base of the shell and by their projection beyond the perimeter of the latter produce an anchoring arm arranged to receive a ground stake 15. A non-rotary shaft 16 is supported on the axial line of the shell to extend between the two end walls 17 and 18 of the latter, and as a means for holding the shaft against rotation the two ends are turned down and suitably flattened upon diametrically opposite sides to fit in correspondingly shaped holes formed in the end walls. Made freely rotatable upon the shaft and disposed to occupy a position more or less central to the width of the shell and serving to partition the latter into compartments 20 and 21 is a disc 22, and this disc has a plate 23 fastened to one side thereof and, with the latter, produces a winding reel for a snare line 24. The plate, in more particularity, is die-stamped to form an annular channel, concentrically placed with respect to the shaft, the floor of which bears against and is secured to the partitioning disc 22 and there is thus produced a peripheral spool-groove 25 outside, and a closed chamber 26 inside, the channel-forming walls. As a motor for the reel there is housed within the closed chamber 26 a coil spring 28 anchored by its inner end to the shaft and secured by its outer end to the reel. The spring is applied such that the snare line is caused to wind itself upon the reel by assertion of the spring's suppressed load. The free end of the snare line projects through an opening 27 in the peripheral wall of the shell, and the width of this opening is such as to preclude the looped extremity from being drawn into the shell.

Attached to the face of the disc 22 to occupy a position upon the side of the latter opposite the spring motor is a ratchet wheel 30, and this ratchet wheel is of the reverse type in which buttress teeth 31 and 32 are formed at opposite ends of rim-segments occurring at equidistant circumferentially spaced intervals.

As a means for preventing an unwinding movement of the wheel, the invention provides a dog 33 arranged to engage the teeth 31, and this dog, centrally pivoted as at 34 to the shell, is urged into ratching engagement by a spring 35. The dog is made selectively inactive by pressure exerted from a lug 36 projecting in the nature of a wing from a lever 37 pivoted by an end to the shell, the pressure being applied to the end of the dog opposite the catch. The pivot pin for the lever is denoted 38. Upon the lever's free end there is mounted a control pin 39 which projects through an arcuate slot 40 cut in the wall 17 of the shell, and such control pin is given limited movement in a direction lengthwise of the lever to permit the lever to be releasably locked in a side notch 41 placed at the lower end of the slot, and namely in a position whereat the lever presses upon the dog and holds the latter out of engagement with the ratchet teeth 31. A thumb-knob 44 is fitted upon the exposed end of the control pin.

In addition to the dog 33, there is provided a second dog which is made functional to the ratchet teeth 32, and this second dog, denoted 42, is made rigid with a lever 43. This lever is of the second order, being fulcrumed as at 45 to the shell and having its free end working through a circumferentially extending slot 46 formed in the peripheral wall of the shell, the exposed end of the lever accommodating the attachment of the inner end of a trip cord 47 arranged, when the trap is set, to be positioned in spanning relation to an open noose N (Fig. 1) produced by the exposed free end of the snare line. The outer end of the trip cord's free end is fastened to a stake S.

The position of the parts is such that the levers 37 and 43 move from a crossed position, whereat the same are both inactive, into an operating position bringing the two levers very nearly into overlying relation, and there is connected across the two levers a double-throw spring, denoted 48, so placed as to cause the lever 43 and its dog 42 to be influenced toward the ratchet wheel when the free end of the lever 37 is depressed into the position in which it is shown in Fig. 4 and to be influenced directively from the ratchet wheel when the free end of the lever 37 is raised into the inactive position in which it is shown in Fig. 5.

The operation of the device may be described as follows:

The operator, wishing to set the trap, first moves the lever 37 downwardly by pressure exerted upon the thumb-knob 44 and this elevates the catch of the dog 33 out of engagement with the ratchet wheel while coincidentally snapping the spring 48 over center to draw the lever 43 inwardly, all of which will be seen from an inspection of Fig. 4. Grasping the exposed end of the snare line, the operator now unwinds the snare-line 24 as indicated by the direction arrow A, and in the course of such unwinding the spring motor becomes heavily loaded while the dog 42 clicks freely over the rim-segments, performing a ratcheting function in that it precludes a return movement of the wheel. When the snare line has been withdrawn to the extent desired and such, more especially, as will enable a noose of the desired diameter to be formed, the operator places this formed noose upon the ground and stakes the free end of the trip line as shown in Fig. 1. It will be understood that the wound spring subjects the ratchet wheel to a relatively heavy spring load, and that in consequence thereof a friction grip obtains between the dog 42 and a ratchet tooth 32 which is sufficient, in the absence of any disturbance of the lever 43, to hold the dog 42 in engagement with the ratchet wheel, and this is to say that the friction grip, while tenuous, will hold the dog in engagement even though the lever 37 is raised to responsively cause the spring 48 to work counter to such engagement. The operator may therefor safely retract the lever 37 as long as the lever 43 is not disturbed, and this he now does, firmly holding the latter lever with one hand while using the other hand to raise the thumb-knob 44, and the resulting position of the parts is as indicated in Fig. 5, with the catch of the dog 33 being brought into engagement with the ratchet wheel by force of the previously suppressed spring 35. Pressure of the operator's hand upon the exposed end of the lever 43 is now carefully withdrawn, and the trap is set. As an animal later trips the trip line, dog 42, being highly sensitive to any jar, is dislodged from the ratchet wheel and the spring motor takes hold to draw the snare tight, the line being drawn into the shell as indicated by arrow B in Fig. 2. The original setting of the spring is such that there is constant tension upon the line. Dog 33 perforce precludes the snare line from being drawn outwardly should the force of the animal's exertions be sufficient to overpower this constant spring load.

I am aware that there is a snare-type trap illustrated and described in Pat. No. 2,224,474, issued December 10, 1940, and which bears a surface similarity to the trap of the present invention, but among several refinements peculiar to the present invention, and which will have been apparent from the foregoing detailed description, perhaps the most salient advance differentiating the instant development is the feature of a spring motor made self-winding in consequence of drawing out the snare line and as distinguished from a key-wound spring motor as embodied in the said prior trap. No unnecessary limitations are to be implied from my unaided detailed description, as it is my intention that all forms of construction and variations in detail coming within the scope of the hereto annexed claims are to be considered as comprehended by the invention.

I claim:

1. A snare-trap comprising a closed housing, a snare line, a reel for the line journaled for rotation in the housing, a coil spring held under constant tension within the housing and operatively connected with the reel to serve as a motor for winding in the snare line, the act of drawing out the snare line operating automatically to wind the motor, a ratchet assembly including a dog operating when the dog is in ratcheting position to prevent a return travel of the snare line means operatively associated with said dog and manually controlled from outside the housing for causing said dog to be active or inactive at will, and means tending to move the dog out of ratcheting position but caused, in the absence of a jarring impulse transmitted to the dog, to be held inactive by force of friction developed upon the dog.

2. A snare-trap comprising a closed housing, a snare line, a reel for the line journaled for rotation in the housing, a coil spring held under constant tension within the housing and operatively connected with the reel to serve as a motor for winding in the snare line, the act of drawing out the snare line operating automatically to wind the motor, a ratchet assembly including a dog operating when the dog is in ratcheting position to prevent an unwinding of the reel, manually controlled means for causing said dog to be active or inactive at will, a second ratchet assembly including a second dog operating when the second dog is in ratcheting position to prevent a winding of the reel, means tending to move the second said dog out of ratcheting position but caused, in the absence of a jarring impulse transmitted to the dog, to be held inactive by force of friction developed upon the dog, and a trip line functionally associated with the second named dog and operated when tripped to jar the dog and causing the means last recited to exert its influence and move the dog out of ratcheting position.

3. A snare-trap comprising a housing, a snare line, a reel for the snare line journaled for rotation in the housing, a coil spring received in the housing and operatively connected with the reel to serve as a motor for winding in the snare line, a two-way ratchet assembly functionally associated with the reel and including independently acting dogs, one to prevent a winding movement of the reel and the other to prevent an unwinding movement of the reel, a double-throw spring for the first said dog movable into positions operative to urge the dog either into or out of ratcheting engagement, and a manually controlled means for shifting the spring into either the first or the second said positions selectively while simultaneously and in the respective instances causing the second named dog to be moved out of and into ratcheting position.

4. A snare-trap comprising a housing, a snare line, a reel for the snare line journaled for rotation in the housing, a coil spring received in the housing and operatively connected with the reel to serve as a motor for winding in the snare line, a two-way ratchet assembly functionally associated with the reel and including independently acting dogs, one to prevent a winding movement of the reel and the other to prevent an unwinding movement of the reel, a manual control by which to move the second said dog either into or out of ratcheting position, a double-throw spring for the first said dog movable into positions operative to urge the dog either into or out of ratcheting position, and manually controlled means for shifting the spring into either of said positions selectively.

5. A snare-trap comprising a housing, a snare line, a shaft supported within the housing and held by the latter against rotation, a disc journaled upon the shaft to occupy a position central to the length of the latter and serving to partition the housing into two compartments, a plate secured to the disc to occupy one of said compartments and acting in complement with the disc to produce a reel for the snare line, a coil spring motor for the reel housed in the compartment last mentioned and anchored by one end to the shaft and by the other end to the reel, a two way ratchet wheel fixed to the disc to occupy the other compartment, and selectively employed dogs for the ratchet wheel also housed in the compartment last mentioned and operating one to prevent the snare line from being wound upon the reel and the other to prevent the snare line from being unwound, means being provided by which both dogs are held in ratcheting position when the trap is set and whereby the dog which prevents winding of the snare line is caused to be disengaged by the transmitted force of a light jar.

6. The snare-trap of claim 5 in which the plate is formed with an annular channel, concentrically placed with respect to the shaft and arranged to bear upon the disc and serving with the disc to describe a spool-groove exteriorly of the outer side wall of the channel and a closed chamber for the spring motor interiorly of the inner side wall of the chamber.

JAMES D. TAYLOR.

REFERENCES CITED

The following references are of record in the file of this patent:

UNITED STATES PATENTS

| Number | Name | Date |
|---|---|---|
| 371,777 | McCabe | Oct. 18, 1887 |
| 1,524,011 | Ballew | Jan. 27, 1925 |
| 1,567,214 | Van Tassel | Dec. 29, 1925 |
| 2,224,474 | Draggoo | Dec. 10, 1940 |